United States Patent Office 2,783,421
Patented Feb. 26, 1957

2,783,421

COMPENSATED VELOCITY SERVO-LOOP SYSTEM

Karl W. Hering, Ridgefield, Conn., assignor to The Perkin-Elmer Corporation, Norwalk, Conn., a corporation of New York Application December 31, 1953, Serial No. 401,552

12 Claims. (Cl. 318—19)

This invention relates to velocity servo systems such as those employed in integrators, and in computers for navigation, sighting and many other purposes.

In such applications the incoming control signal voltage is translated in terms of shaft velocity which is subject to error due to deviations in frequency of the electric power supply from which the system is energized. The object of the invention is to compensate automatically for the effects of such frequency deviations and thus cancel the error.

Velocity servo systems may include an induction type tachometer generator driven by a servomotor, and it is possible to design a filter for the tachometer output which, within certain limits, will compensate the tachometer output voltage so that, with constant signal voltage and over a certain range of frequency deviation of the supply source voltage, the velocity of the servomotor and tachometer will remain constant to a substantial degree. However, the principal disadvantage of this expedient is that such a filter must be designed especially for each tachometer and, since these machines must occasionally be replaced, it has been found to be expensive to provide an individual network for each tachometer.

On the other hand the present invention provides a system which automatically compensates for usual frequency deviations, and the same system may readily be readjusted for operation with different tachometers so as, at a given signal voltage, automatically to maintain the tachometer shaft velocity substantially constant, viz., within approximately 0.1% over a variation of plus and minus 5% in source frequency. The necessary measurements and readjustment to adapt my compensating system to a new tachometer may be made in less than half an hour by a laboratory technician.

The present invention utilizes the facts that an inductance tachometer generator of the drag-cup type with load resistor, as employed in velocity servo systems, can be represented by a simplified equivalent circuit in the region of the normal frequency of the power supply (here assumed to be 400 cycles per second), and that the above-mentioned error in velocity of such a servo tachometer, and consequently of its output voltage, is due to the simultaneous generation of a deviated in-phase component, and of a 90° or quadrature voltage component the magnitude of which is related to the frequency deviation of the power supply. The erroneous in-phase component directly causes the servomotor to run at an incorrect speed, and the quadrature component, while incapable of operating the motor, tends to saturate the amplifier which is included in the servo loop and thus to reduce the gain of the loop on which accuracy of operation also depends.

In accordance with the present invention the mentioned error is compensated for by combining with the feedback voltage a compensating voltage of such magnitude and phase as to restore the net in-phase voltage from the tachometer to a value which would obtain were the frequency of the power source maintained constant at its normal value. The mentioned compensating voltage is derived from a circuit which provides a voltage in proper phase through a network having a phase-frequency characteristic substantially equal to that of the tachometer output circuit. The magnitude of the compensating voltage is automatically selected from a voltage divider, or the equivalent, by a position servomotor arranged to be actuated in response to the mentioned out-of-phase or quadrature component.

The invention will be better understood from the following description considered in connection with the accompanying drawings, in which.

Figure 1:
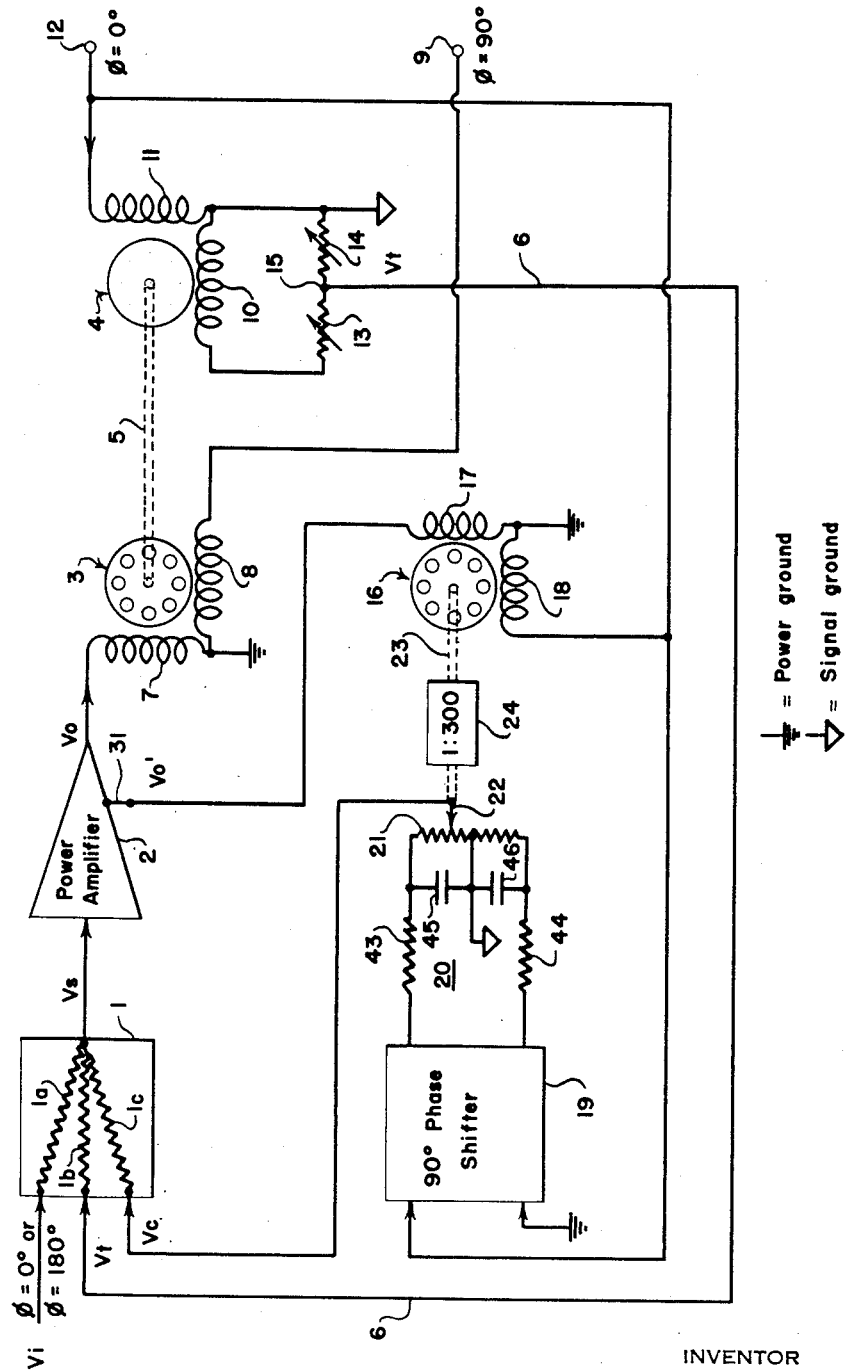
Fig. 1 is a schematic diagram partly in block form showing one embodiment of the invention which includes a velocity servo loop and a compensating servo loop in accordance with the invention.

Referring now to Fig. 1, the general representation of a velocity servo system includes a summing device 1 which constitutes, as shown, a plurality of impedances such as resistors 1a, 1b, 1c, connected in common at the output end and having individual voltage inputs, a power amplifier 2, a servomotor 3, a tachometer generator 4 driven by motor 3 through shaft 5, and a feedback loop 6 connected to feed voltage from the output circuit of tachometer 4 to the input of resistor 1b. Resistors 13 and 14 comprises a shunt resistance connected across tachometer winding 10, forming therewith an output circuit to which feedback connection 6 is made at tap 15.

The control voltage $V_o$ received from the output of power amplifier 2 energizes control winding 7 of servomotor 3. The excitation winding 8 of motor 3, which is at 90° to winding 7, is excited by a suitable power source 9 of a phase at 90° to the control voltage in winding 7. Thus the velocity of rotation of motor 3 will be a function of the magnitude of control voltage or more accurately of the in-phase component of the control voltage. This type of two-phase servomotor is well known in the art and requires no further description. The drag-cup type induction tachometer 4 also comprises a well-known device and is designed to generate an A. C. voltage proportional to its speed. Suitable servomotor-tachometer combinations are known in the art and commercially available. The output voltage $V_t$ is developed in output winding 10 as the result of rotation of the armature in an electromagnetic field generated by excitation winding 11 which is energized from voltage source 12 at phase 0°, viz., in phase with the input signal voltage $V_i$, connected to the input of resistor 1a. The phasing and adjustments of this velocity servo loop are such that servomotor 3 will rotate tachometer 4 at a velocity in proportion to the magnitude of the voltage $V_i$ provided that the gain of amplifier 2 is sufficiently high so that a small difference between the voltage magnitudes of $V_i$ and the in-phase component of $V_t$ will produce sufficient voltage $V_o$ to drive the motor 3 at the correct speed.

The in-phase component of the tachometer voltage is less for the same shaft speed when the source frequency increases, and more when the source frequency decreases. Hence the motor must increase its speed accordingly to balance the system in the first case and must decrease its speed to balance the system in the second case. More briefly, the servo will rebalance itself at a different shaft speed for each change in output voltage from the tachometer, and the servomotor 3 will increase or decrease its speed depending upon the magnitude of the difference voltage. However, the particular characteristics and adjusted mode of operation of the velocity servo system above described will depend upon the nature of the specific application.

Figure 5:
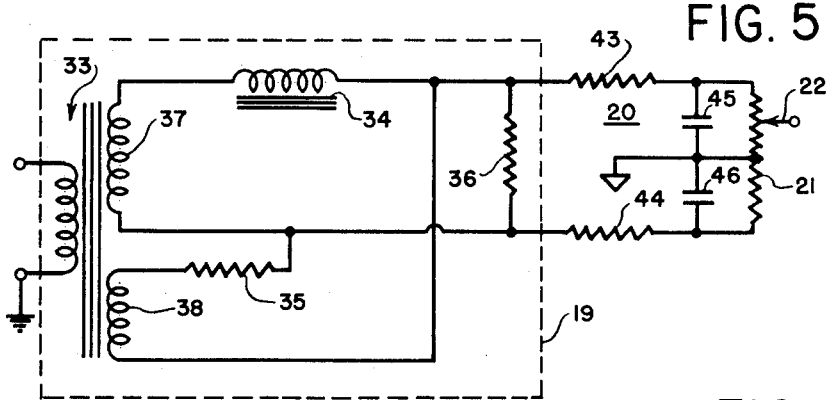
Fig. 5 is a circuit diagram of a phase shifter and delay network employing resistance and capacitance suitable for use in the systems of Figs. 1 and 3.
Figure 6:
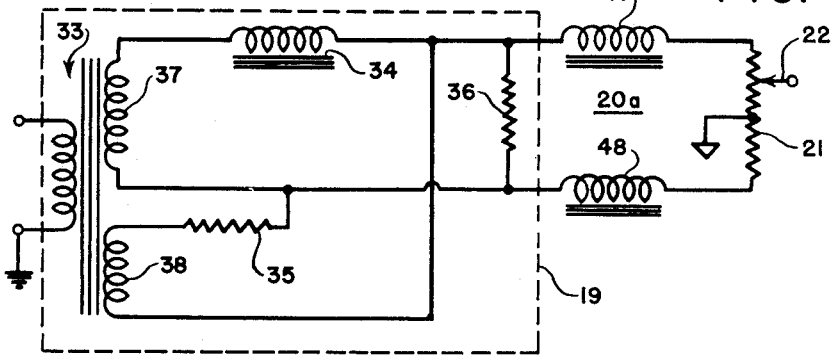
Fig. 6 is a circuit diagram of a phase shifter and delay network employing inductance and resistance as an alternative to the corresponding components of Fig. 5.
Figure 7:
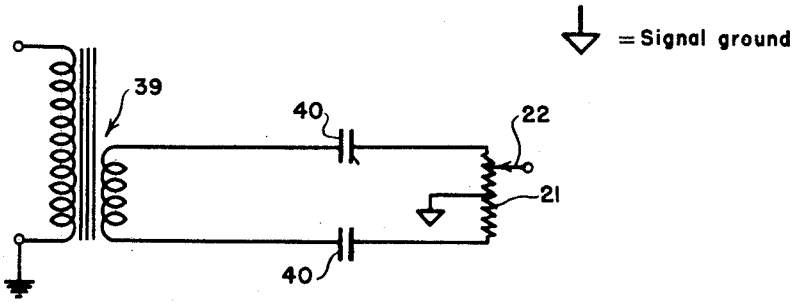
Fig. 7 is an alternative circuit suitable to replace the phase shift and delay networks of Figs. 5 and 6.

In accordance with the invention a compensating system is provided to restore the instantaneous in-phase component of the tachometer output voltage to the value which would obtain in the absence of frequency deviation of the power supply which furnishes voltage to source terminals 9 and 12. This compensating system comprises a position-servo loop including position servomotor 16 having a control winding 17 and excitation winding 18, a phase shifter 19 and a delay network 20. Phase shifter 19, which derives its power from source 12, should be of precision type such as shown in Figs. 5, 6 and 7, and is designed to shift the phase of the voltage by 90°. The output voltage from network 20 is developed across potentiometer 21 provided with a movable contactor 22, adjustment of which selects the magnitude of compensating voltage $Vc$ impressed upon the input of resistor $1c$ of summing device 1. Contactor 22 is movable in either direction by motor 16 through a suitable drive shaft 23, including a reduction gear 24 which, for example, may have a ratio of 1:300.

Analysis of a tachometer of the type herein contemplated shows that a network which is electrically completely equivalent is rather complicated. However, for practical purposes over a limited frequency range such a tachometer can be represented as a voltage source across the terminals of which is connected a series circuit comprising inductance and two resistances one of which is the internal resistance of the tachometer itself and the other a load resistance here designated as 13, 14. The output impedance of the tachometer should preferably be low, and the tap 15 on the output load resistance should be selected to obtain the value of output voltage required for the desired operation of the velocity servo system.

It has already been mentioned that in the general case the transfer function of the tachometer should equal the transfer function of the network 20 when the compensating loop is employed in accordance with the invention. In the present specific case this means that the phase and magnitude slopes at carrier frequencies of the network 20 and of the tachometer output circuit should be equal. This relation should be as nearly equal as practicable, inequality up to approximately 5% usually being tolerable.

When it is desired to substitute a new tachometer 4 in the system, the network 20 need not be changed, but resistances 13, 14 are adjusted to make the time constant of the output circuit of the new tachometer the same as that of the network 20. At 15 the proper voltage is developed $Vt$ to operate the servomotor 3 at the intended velocity. In one embodiment of the invention this tap provided 283 millivolts per 1,000 R. P. M. Thereafter the values of resistors 13, 14 and the value of tap 15 would normally remain fixed as long as that tachometer is in service.

It can be shown quantitatively that, after the mentioned adjustments have been made, the in-phase component of the compensating voltage which effects the correction by combining with the feedback voltage, is automatically maintained sufficient to correct for the frequency-changed magnitude of the in-phase component of tachometer output voltage, and also that the 90° component of the compensating voltage $Vc$ will be equal and opposite to the quadrature component of the tachometer output voltage. Thus the quadrature component fed to the amplifier will be cancelled out, with the mentioned resulting improvement in accuracy. This cancellation effect applies to all quadrature voltage components which would tend to saturate the amplifier, because the auxiliary servomotor 16 operates on the entire quadrature component of control voltage $Vo'$ appearing at the amplifier output. In general, the tachometer excitation voltage should be in phase with the signal voltage $Vi$; and the excitation voltages for the servomotors should be relatively displaced 90° within plus or minus approximately 5%.

The accuracy of servo systems of the type herein referred to depends on temperature of the tachometer as well as on constancy of frequency of the power source. Inaccuracy due to temperature changes has heretofore been minimized by the expensive expedient of enclosing the tachometer in a chamber wherein the temperature is automatically controlled. It has been found, however, that use of the compensating servo system of this invention greatly reduces error due to temperature change because of the fact that the magnitude as well as the phase of the tachometer output voltage change with temperature in such a way that these are compensated for by the compensating servo loop of the invention.

Figure 2:
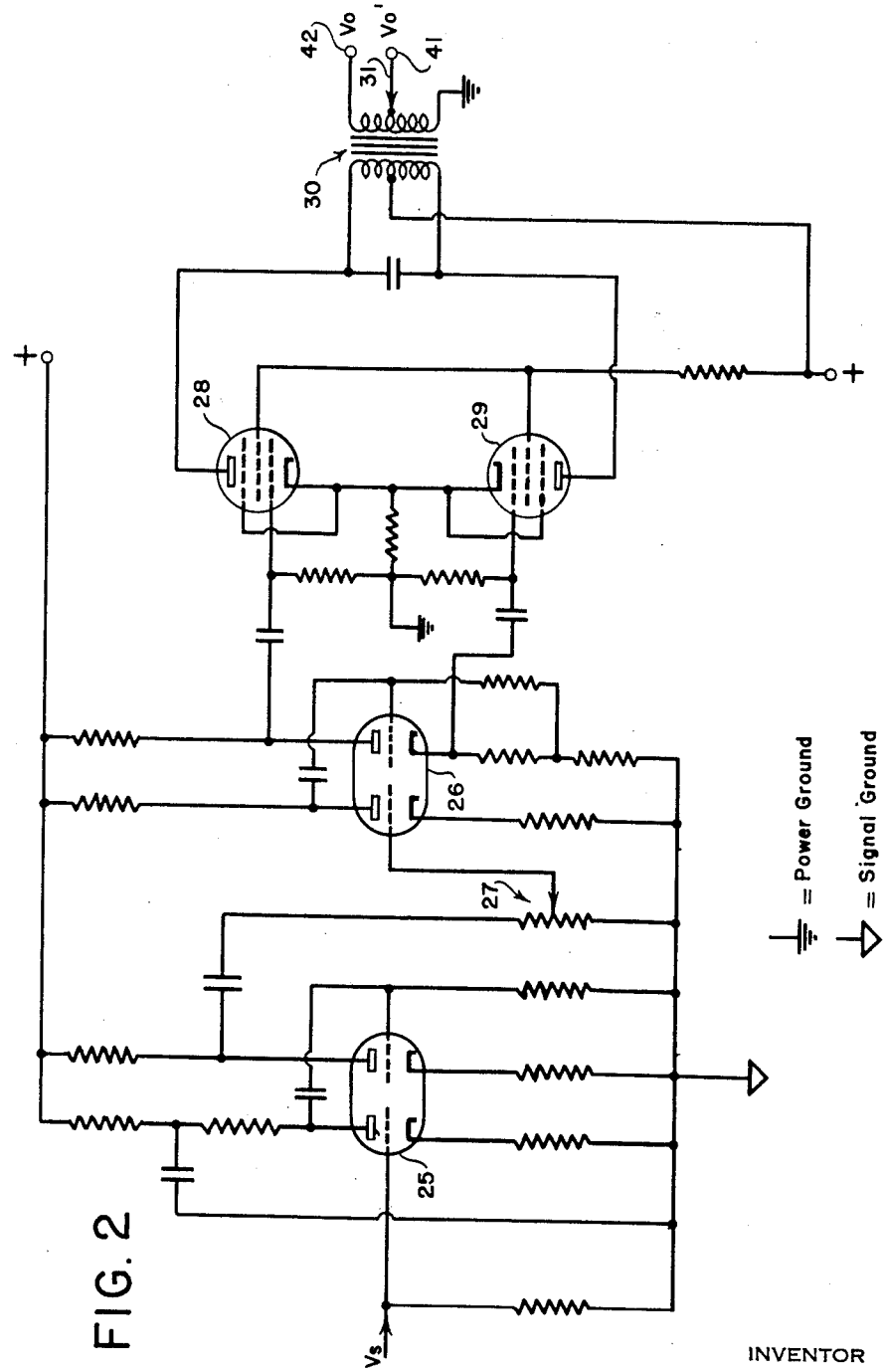
Fig. 2 is a circuit diagram of the amplifier portion of Fig. 1.

Power amplifier 2 represented in Fig. 1 is shown in Fig. 2 in circuit diagram form. Here the voltage $Vs$ comprising the combined signal, feedback and compensating voltages from summing device 1 of Fig. 1 is impressed upon the input grid of the first tube 25 of the amplifier. The input grid of tube 26 is coupled to the output of the second triode section of tube 25 through potentiometer 27 by which the gain of the amplifier is adjustable. Tubes 25 and 26 are of the double triode type such as the 12AU7, 12AX7, or 6J6. Output amplifier tubes 28, 29 are connected in push-pull relation, as shown, and may be of type 6AQ5 or 5687. Coupling transformer 30 serves to connect the outputs of tubes 28, 29 in push-pull relation and to couple them as a unit to the control winding 17 of servomotor 16 with proper impedance matching. For this purpose adjustable tap switch 31 and terminal 41 are provided. The output terminal 42 of Fig. 2 connects the entire secondary winding of transformer 30 to the control winding 7 of servomotor 3 (Fig. 1). The output voltages $Vo$, $Vo'$ are in phase with the input $Vs$. It is believed that the remaining circuit elements of the amplifier and their connections are sufficiently conventional as to require no further description. It has been found that an over-all gain of approximately 10,000 is satisfactory for this amplifier, as measured independently of the summing resistors.

Figure 3:
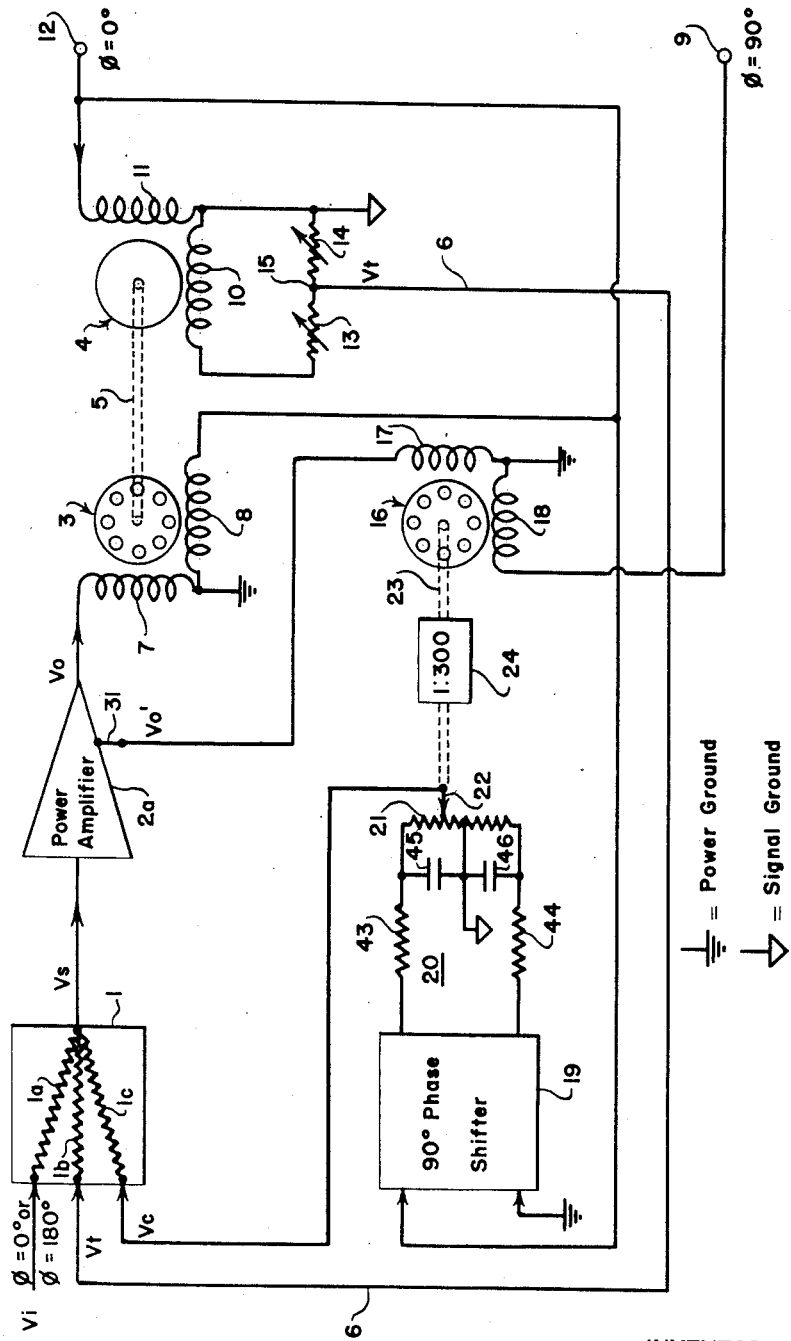
Fig. 3 is an alternative of the embodiment of Fig. 1 in which the relative phases of certain of the energizing voltages are different to accommodate a shift of phase in the amplifier.

The embodiment of the invention illustrated in Fig. 3 is an alternative to that of Fig. 1, but the phases of certain of the energizing voltages on the energizing windings are different in order to accommodate a 90° phase shift in the power amplifier $2a$. In comparing the circuit connections of Fig. 3 with those of Fig. 1 it will be noted that the phases of the voltages on the energizing windings 8 and 18 of the two servomotors 3 and 16, respectively, are interchanged in the two figures. In other words, in Fig. 3 energizing winding 8 receives its voltage from terminal 12 at a phase of 0° and the energizing winding 18 receives its voltage from terminal 9 at a phase of 90°, whereas these windings are connected to the opposite terminals in Fig. 1. Otherwise the systems of Figs. 1 and 3 are the same except for the mentioned difference in the amplifier $2a$ which will be described below. It may here be repeated that the energizing voltages at terminals 12 and 9 are derived from a common power source. The control signal $Vi$ would also be derived from the same common source. A 400-cycle three-phase generator of the type employed on aircraft is typical of such a source. Two two-phase voltages one of which is 90° displaced with respect to the other may readily be obtained from a three-phase source by use of the well-known Scott type transformer, or by other known means. In the specific embodiment here referred to, the voltage at terminals 12, 9 was 26 volts.

Figure 4:
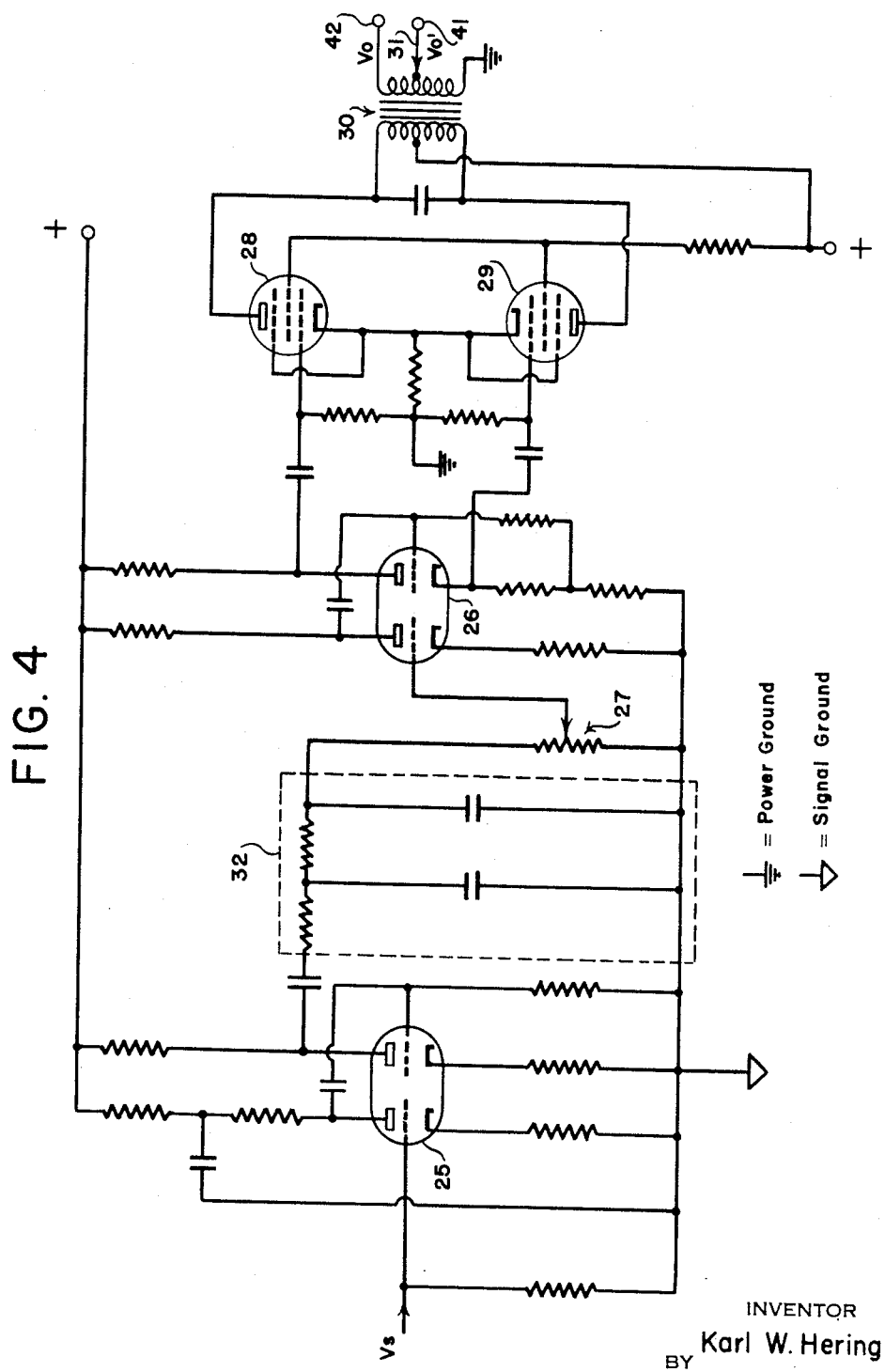
Fig. 4 is a circuit diagram of the amplifier portion of Fig. 3.

The amplifier 2a represented in Fig. 3 is shown in circuit diagram form in Fig. 4. The components of the amplifier itself are substantially identical to those of Fig. 2 above described. However, between amplifier tubes 25 and 26 a phase-shift network 32 is included, this network comprising resistors and capacitors proportioned to shift by 90° the signals which pass through amplifier 25. This network also serves as a low-pass filter and removes harmonics as well as other undesired voltage components. The use of the 90° phase shifter 32 results in a corresponding shift of phase of the voltages Vo and Vo' at the outputs 42 and 41 of transformer 30. Hence, as above stated, it is necessary that the phases of the excitation voltages connected to the windings 8 and 18 of servomotors 3 and 16, respectively, be correspondingly shifted. Servo systems of the type of Figs. 1 and 3 are insensitive to phase shifts in the amplifier of the order of 10°, and in excitation voltage on both servomotors up to the order of 10°.

Figs. 5 and 6 illustrate alternative forms of delay networks connected to receive the output voltage from a 90° phase shifter. The phase shifter 19 shown in Figs. 5 and 6 is represented by block 19 in Figs. 1 and 3. This type of phase shifter, which is known in the art, comprises a three-winding transformer 33, the two secondary windings 37 and 38 of which are connected together at one end by inductance coil 34 and are connected together at the other end by resistor 35. Output resistor 36 is connected across winding 37 through inductance 34. A phase shifter of this type will provide a phase shift with considerable accuracy which is here necessary in order to furnish an accurately phased "clean" voltage for compensating purposes.

The delay network 20 shown in Fig. 5 is of the form represented in Figs. 1 and 3. This combination of resistors 43, 44 and capacitors 45, 46 has been found to be satisfactory for the purpose, although the network 20a illustrated in Fig. 6 is substantially equivalent. The latter network includes two inductance coils 47, 48 in the place of the resistors 43, 44 and the capacitors 45, 46 shown in Fig. 5. In both cases a potentiometer 21 is illustrated as comprising a satisfactory means for selecting suitable magnitudes of voltage to be fed back to the summing device for use as a compensating voltage. A maximum magnitude of plus and minus 1 volt is usually sufficient.

The phase shifter and delay networks of Figs. 5 and 6 may be replaced by equivalent circuits, of which one is known in Fig. 7. Here an input transformer 39 of the step-down type feeds potentiometer 21 through two like capacitors 40. This provides the required phase shift and an advance instead of a lag in voltage. If properly adjusted this circuit will provide a suitable compensating voltage, but the circuits of Figs. 5 and 6 are usually preferable because they produce harmonics only at lowest voltages whereas the system of Fig. 7 produces harmonics increasingly at higher voltages.

Although, as above indicated, it is desirable to employ load resistance 13, 14 at the output of the tachometer, this is not essential, because the magnitude of feedback voltage can be adjusted by adjustment of the excitation voltage in winding 11; and approximate equality of transfer functions of the tachometer output circuit and lag network can be achieved by proper selection of the values of the circuit elements comprising the lag circuit 20, or 20a itself.

I claim:

1. In a velocity servo-loop system having an alternating-current tachometer driven by a servo-motor energized from a common power source, the input signal to said servomotor including a feedback voltage derived from said tachometer and said servo-motor being adapted to respond only to that component of its input having a particular phase relative to said source, the method of compensating for changes in the amplitude of the effective component of said feedback signal due to frequency deviation of said source, which comprises the steps of deriving from said source a signal having substantially the phase-frequency characteristic of said feedback voltage, picking off an amplitude of said signal as a function of the quadrature component of said feedback voltage, and impressing the tapped signal upon the servo-motor, whereby the system is unaffected by frequency deviation of the source.

2. In a velocity servo-loop system, an alternating-current power source for energizing said system, a tachometer generator of the alternating-current induction type, a servo-motor for driving the generator, said servo-motor being responsive only to that component of its input having a particular phase relative to the phase of said source, means for feeding back the output of said generator to said servo-motor through an amplifier, and means to compensate for changes in the amplitude of the effective component of said feed-back signal due to frequency deviation of said source, said means including a resistance-reactance network connected to said source, the resistance and reactance values of the components of said network being such that frequency deviation of said source produces a signal varying in phase substantially as said feedback voltage, means for tapping a portion of said network signal as a function of the quadrature component of said feedback signal, and means for impressing said tapped network signal upon said servo-motor whereby the speed of said servo-motor is unaffected by frequency-deviation of said source.

3. A servo-loop system according to claim 2 in which the means for adjusting the magnitude of the signal tapped from said network includes a second servo-motor having an excitation winding energized from said source and a control winding connected to the output of said amplifier, an adjustable tap connected to the output of said network and driving means coupling said last-named servo-motor to said tap to actuate the same.

4. A servo-loop system according to claim 3 in which said first-mentioned servo-motor has an excitation winding which is energized also from said source but at a phase of substantially 90 degrees with respect to the phase of the voltage impressed on the excitation winding of said second servo-motor, and in which said amplifier includes a 90° phase shifter so that the amplified output signal is substantially in phase with the input signal, and connecting means exciting said generator and said first-mentioned servo-motor respectively by voltages derived from said source at phases relatively displaced substantially by 90 degrees.

5. A velocity servo-loop system according to claim 2 in which said amplifier is of the type in which the output signal is substantially 90 degrees out of phase with the input signal and the means for adjusting the magnitude of the voltage tapped from said network includes a second servo-motor having a movable member, an excitation winding energized from said source and a control winding energized from the output of said amplifier, said first-mentioned servo-motor having an excitation winding which is energized from said source at a phase of substantially 90 degrees with respect to the phase of the voltage impressed on the excitation winding of said second servo-motor, means exciting said generator and said first-mentioned servo-motor respectively by voltages derived from said source at substantially the phase of the inphase component of said signal, an adjustable tap connected to the output of said network and driving means coupling the movable member of said second servomotor to said tap for moving said tap in response to and in accordance with the quadrature component of the generator output voltage, wherefrom to derive said compensating voltage.

6. In a velocity servo-loop system, an alternating-current power source for energizing said system, a tachometer generator of the alternating-current induction type, a servo-motor for driving the generator, said servo-motor being responsive only to that component of its input having a particular phase relative to the phase of said source, means for feeding back the output of said generator to said servo-motor through an amplifier, and means to compensate for changes in the amplitude of the effective component of said feedback signal due to frequency deviation of said source, said means including a resistance-reactance network connected to said source, the resistance and reactance values of the components of said network being such that produce a signal varying in phase in response to a predetermined range of frequency deviation substantially as said feedback signal, means for tapping a portion of said network signal as a function of the quadrature component of said feedback signal, and means for impressing said tapped network signal upon said servo-motor whereby the speed of said servo-motor is unaffected by frequency-deviation of said source.

7. In a velocity servo-loop system, an alternating-current power source for energizing said system, an alternating-current tachometer generator driven by a servo-motor having an excitation winding and a control winding, said servo-motor being adapted to operate in response to an alternating-current signal, means for exciting said generator with a voltage derived from said source which is in phase with said signal, an amplifier the output of which is coupled to the control winding of said servo-motor, a feedback loop connecting the output voltage of said generator to the input of said amplifier, and means connected to the amplifier input for combining the feedback voltage from said generator with the signal to comprise an operating voltage for said servo-motor, means for compensating for error in velocity of said servo-motor and of said generator due to variation in frequency of said power source, which includes a phase-shifter for deriving from said source a voltage of phase 90 degrees displaced with respect to said signal, a resistance-reactance network coupled to the output of said phase-shifter, the resistance and reactance values of the components of said network being such that frequency deviation of said source produces a signal varying in phase substantially as said feedback voltage, voltage-tapping means connected to the output of said network, a servo-loop of the position type including a second servo-motor having a control winding and an excitation winding, means connecting excitation voltages derived from said power source to the excitation windings of said servo-motors, said excitation voltages being mutually displaced in phase by 90 degrees, means impressing on the control winding of said second servo-motor a control voltage derived from the output of said amplifier, driving means coupling the moving element of said second servo-motor to said tapping means for adjusting the said tapped signal in response to and in accordance with the quadrature component of the generator output voltage to provide a compensating voltage, and means combining said compensating voltage with said signal and at least a portion of said generator output voltage at the input of said amplifier.

8. In a velocity servo-loop system including a servo-motor-driven tachometer of the alternating-current induction type, an excitation winding for said tachometer, control voltage and excitation windings for said servo-motor, an amplifier the output of which is connected to the control voltage winding of said servomotor, a plurality of impedances having separate inputs and a common output, said output being connected to the input of said amplifier, means for applying an alternating-current signal voltage to the input of a first of said impedances, a feedback connection from the output of said tachometer to the input of a second of said impedances, means for connecting the excitation winding of said tachometer to a source of voltage in phase with the signal voltage, and means for connecting the excitation winding of said servo-motor to a source of alternating-current voltage of phase at 90 degrees to that of the voltage impressed on the control voltage winding of said servo-motor, said excitation voltages having their origin in a common power supply, means for automatically correcting variations in output voltage of said tachometer due to deviations in frequency of said excitation voltage from a normal frequency value, which comprises output impedance means connected to the output of said tachometer and imparting thereto a certain time constant, a servo-loop of the position type including an auxiliary servo-motor having a movable member, a control winding and an excitation winding, means energizing said last-named winding with a voltage derived from said common power supply and a phase 90 degrees displaced with respect to that of the excitation voltage impressed on the first-mentioned servo-motor, an auxiliary voltage source in common with that of said excitation voltages and of phase at 90° to that of the signal voltage, voltage-selecting means adjustable by a movable element, a time-constant circuit coupling said auxiliary voltage source to said voltage-selecting means and having a phase-frequency characteristic commensurate with that of said tachometer together with said output impedance means, a connection from the voltage output of said selecting means to the input of a third of said impedances, and mechanical-driving means coupling the armature of said auxiliary servo-motor to the movable element of said voltage-selecting means in accordance with the operation of said auxiliary servo-motor.

9. A system according to claim 8 in which said output impedance means comprises variable resistances provided with a center tap to which said feedback connection is made.

10. In a velocity servo-loop system including a first servo-motor, an alternating-current tachometer driven thereby, an amplifier having an output connected to the input of said servo-motor to control the same, means for connecting an alternating-current control signal to a junction point at the input side of said amplifier, feedback means connecting an output voltage from said tachometer to said junction point, and a common alternating-current voltage source connected to excite said servomotor and said tachometer, means for compensating amplitude variations in the effective component of the output voltage of said tachometer due to frequency variations of said power source, comprising a compensating servo-loop of the position type including a second servo-motor having a control winding and an excitation winding, a connection from an output of said amplifier to said control winding, means connected to said excitation winding for exciting the same with a voltage derived from said common source but at a phase of substantially 90 degrees with respect to the excitation voltage impressed on said velocity servo-motor, phase-shift means connected to said common source for shifting a voltage derived therefrom to be a phase 90 degrees displaced with respect to said control signal, a resistance-reactance network connected to the output of said phase-shifting means, said network having a phase-frequency characteristic commensurate with that of the tachometer including its output circuit, variable means operated by said second servo-motor to select a portion of the voltage developed by said network in accordance with the magnitude of the quadrature component of the output voltage of said amplifier, and a compensating voltage feedback connection from said voltage-selecting means to said junction point.

11. In a velocity servo-loop system including a first servo-motor, an alternating-current tachometer driven thereby, an amplifier of the type in which the output signal is in phase with the input signal, said amplifier having an output connected to the input of said servo-motor to control the same, means for connecting an alternating-current control signal to a junction point at the input side of said amplifier, feedback means connecting an output voltage from said tachometer to said junction point, and a common alternating-current voltage source connected to excite said servo-motor and said tachometer such that said servo-motor is excited at a phase of substantially 90 degrees with respect to said tachometer, means for compensating for changes in amplitude of the effective component of the output voltage of said tachometer due to frequency variations in said power source, comprising a compensating servo-loop of the position type including an auxiliary servo-motor having a control winding and an excitation winding, a connection from an output of said amplifier to said control winding, means connected to said excitation winding for exciting the same with a voltage derived from said common source but at a phase of substantially 90 degrees with respect to the excitation voltage impressed on said first servo-motor, phase-shift means connected to said common source for shifting a voltage derived therefrom so as to be at a phase 90 degrees displaced with respect to said control signal, a resistance-reactance network connected to the output of said phase-shifting means, the values of the resistance and reactance components of said network being proportioned to produce a signal varying in phase substantially as that of the tachometer including its output circuit, variable means operated by said auxiliary servo-motor for selecting a portion of the output voltage from said network in accordance with the magnitude of the quadrature component of output voltage of said amplifier, and a compensating voltage feedback connection from said voltage-selecting means to said junction point.

12. In a velocity servo-loop system including a first servo-motor, an alternating-current tachometer driven thereby, an amplifier of the type in which the output signal is of phase 90 degrees displaced with respect to the input signal, said amplifier having an output connected to the input of said servo-motor to control the same, means for connecting an alternating-current control signal to a junction point at the input side of said amplifier, feedback means connecting an output voltage from said tachometer to said junction point, and a common alternating-current voltage source connected to excite said servo-motor and said tachometer such that said servo-motor is excited at a phase substantially the same as said tachometer, means for compensating for changes in the amplitude of the effective component of the output voltage of said tachometer due to frequency variations in said power source, comprising a compensating servo-loop of the position type, including an auxiliary servo-motor having a control winding and an excitation winding, a connection from an output of said amplifier to said control winding, means connected to said excitation winding for exciting the same with a voltage derived from said common source but at a phase of substantially 90 degrees with respect to the excitation voltage impressed on said first servo-motor, phase-shift means connected to said common source for shifting a voltage derived therefrom so as to be at a phase 90 degrees displaced with respect to said control signal, a resistance-reactance network connected to the output of said phase-shifting means, the resistance and reactance values of the components of said network being such that produce a signal having a phase-frequency characteristic commensurate with that of the tachometer including its output circuit, variable means operated by said auxiliary servo-motor for selecting a portion of the output voltage from said network in accordance with the magnitude of the quadrature component of output voltage of said amplifier, and a compensating voltage feedback connection from said voltage-selecting means to said junction point.

References Cited in the file of this patent

UNITED STATES PATENTS

| | | |
|---|---|---|
| 2,657,348 | Jarvis | Oct. 27, 1953 |
| 2,671,875 | Urbanik | Mar. 9, 1954 |